United States Patent
Brown et al.

(10) Patent No.: US 7,746,777 B2
(45) Date of Patent: Jun. 29, 2010

(54) CENTRALIZED BANDWIDTH MANAGEMENT METHOD AND APPARATUS

(75) Inventors: Jeffrey Douglas Brown, Rochester, MN (US); Scott Douglas Clark, Rochester, MN (US); John David Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1459 days.

(21) Appl. No.: 10/674,977

(22) Filed: Sep. 30, 2003

(65) Prior Publication Data

US 2005/0068966 A1    Mar. 31, 2005

(51) Int. Cl.
*G01R 31/08* (2006.01)

(52) U.S. Cl. ............... 370/230.1; 370/229; 370/230; 370/231; 370/232; 370/233; 370/234; 370/235; 370/235.1; 370/236; 370/398; 370/395.41; 370/395.42; 370/395.43; 370/450; 370/451; 709/223; 709/224; 709/225; 709/226

(58) Field of Classification Search ......... 370/229–236, 370/398, 395.41–395.43, 450, 451; 709/223–226
See application file for complete search history.

(56) References Cited

U.S. PATENT DOCUMENTS

| | | | | |
|---|---|---|---|---|
| 5,274,644 | A * | 12/1993 | Berger et al. ............... | 370/230 |
| 5,596,576 | A * | 1/1997 | Milito ........................ | 370/450 |
| 5,825,748 | A * | 10/1998 | Barkey et al. ............... | 370/236 |
| 5,950,199 | A * | 9/1999 | Schmuck et al. ............... | 707/8 |
| 6,032,216 | A * | 2/2000 | Schmuck et al. ............ | 710/200 |
| 6,044,406 | A * | 3/2000 | Barkey et al. ............... | 709/235 |
| 6,304,552 | B1 | 10/2001 | Chapman et al. | |
| 6,553,568 | B1 * | 4/2003 | Fijolek et al. ............... | 725/111 |
| 6,570,847 | B1 * | 5/2003 | Hosein ................... | 370/230.1 |
| 6,628,609 | B2 | 9/2003 | Chapman et al. | |
| 6,798,743 | B1 | 9/2004 | Ma et al. | |
| 6,810,031 | B1 * | 10/2004 | Hegde et al. ................. | 370/351 |
| 7,006,440 | B2 * | 2/2006 | Agrawal et al. ............. | 370/235 |
| 7,020,143 | B2 * | 3/2006 | Zdan ..................... | 370/395.21 |
| 7,224,671 | B2 * | 5/2007 | Lee et al. .................... | 370/235 |
| 7,342,887 | B1 * | 3/2008 | Sindhu et al. ............... | 370/235 |
| 7,602,721 | B1 * | 10/2009 | Tangirala et al. ......... | 370/235.1 |
| 2002/0163886 | A1 * | 11/2002 | Zheng et al. ............. | 370/230.1 |
| 2003/0031178 | A1 * | 2/2003 | Haeri et al. ................. | 370/392 |
| 2003/0033421 | A1 * | 2/2003 | Haeri et al. ................. | 709/232 |
| 2003/0099199 | A1 * | 5/2003 | Kiremidjian et al. ...... | 370/230.1 |
| 2003/0227926 | A1 * | 12/2003 | Ramamurthy et al. .. | 370/395.42 |

(Continued)

OTHER PUBLICATIONS

Pasia, Redentor M.; Office Action in U.S. Appl. No. 10/718,936; USPTO; Oct. 30, 2008.

*Primary Examiner*—Frank Duong
*Assistant Examiner*—Christopher P Grey
(74) *Attorney, Agent, or Firm*—Jill Poimboeuf, IBM; Scott Charles Richardson; The Brevetto Law Group

(57) ABSTRACT

Disclosed is an apparatus and method for granting guaranteed bandwidth between one or more data transmission priority requesting sources and one or more resources upon request. Data sources that do not request an assigned bandwidth are served on a "best efforts" basis. The system allows additional bandwidth to priority requesting sources when it is determined that the resource and/or the communication path to the resource is under-utilized. The system further allows the granted bandwidth to be shared by more than one source in a multiprocessor system.

19 Claims, 5 Drawing Sheets

U.S. PATENT DOCUMENTS

2003/0229714 A1* 12/2003 Kiremidjian et al. ........ 709/244
2004/0042399 A1* 3/2004 Bly et al. .................. 370/230.1
2004/0062259 A1* 4/2004 Jeffries et al. ............... 370/412
2004/0267932 A1* 12/2004 Voellm et al. ................ 709/226
2005/0111478 A1* 5/2005 Brown et al. ................. 370/451

* cited by examiner

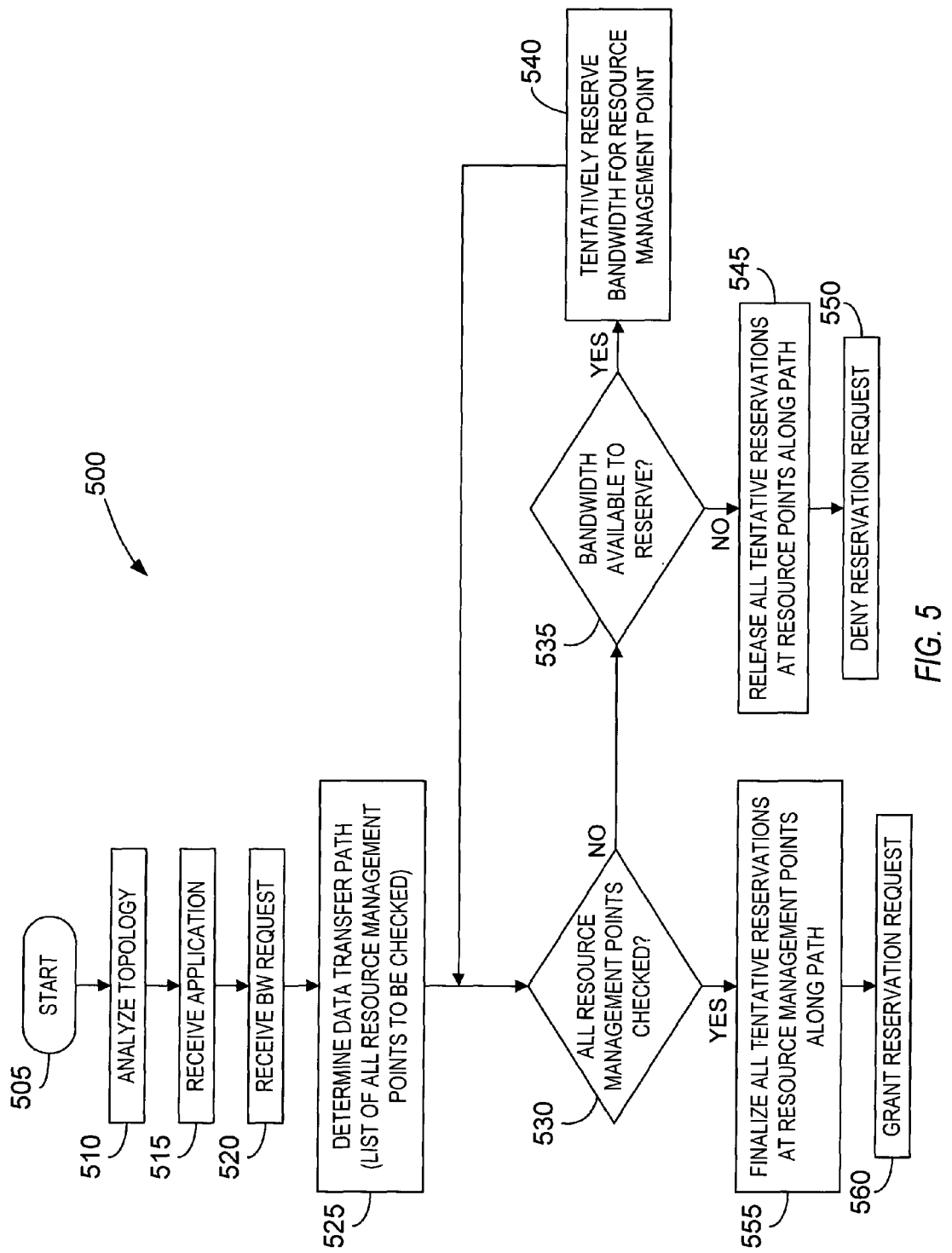

CENTRALIZED BANDWIDTH MANAGEMENT METHOD AND APPARATUS

TECHNICAL FIELD

The invention relates to a centralized BW (Bandwidth) management system for use with a plurality of intelligent devices trying to access a common resource such as a communication path like a bus.

BACKGROUND

Normally, when a plurality of programs or applications on a single computer need to use the bus at the same time, each program is granted less BW (Bandwidth) than it would prefer to use.

In many computers, the OS (Operating System) can be instructed to give priority to some programs and require others to operate in the background. However, if too many of the priority programs require access to the bus, one or more of the priority programs will have to operate at a less than desirable speed. Although such a slowdown situation may be tolerable for some programs, such as word processors, they may be completely unacceptable in a situation where a game, video or other high bandwidth program is being utilized. Inadequate bandwidth, in such a situation, may result in a distorted display, stilted motion or some other similar, and less than desirable, end result.

When the environment is more complex and a plurality of processors and other intelligent entities or devices must access the same bus, the BW (Bandwidth) problem is compounded. Further, when a plurality of PUs are interconnected, programs may be written such that more than one PU is utilized in completing program results. In such a situation, the different parts of the program are likely to attempt communication with a common resource using a common path to get to that resource. Therefore parts of a program may be fighting each other to obtain sufficient BW to complete the program.

It would be desirable to find a method of controlling or governing access to the bus whereby high priority programs are assured of having the BW they need to operate properly. It would further be desirable to be able to guarantee a minimum BW to managed devices, programs or applications and still allow a class of managed device(s) additional BW in situations where the resource is not being heavily used. If would further be desirable to be able to apply the given BW to a managed entity regardless of the PU that is being used to operate or complete the program.

SUMMARY OF THE INVENTION

The present invention comprises using an intelligent BMC (Bandwidth Management Controller) to permit a plurality of load shaper portions of distributed bus request queue managers to share a common class allocation of guaranteed BW in accessing a common resource such as a multiplexed communication path.

BRIEF DESCRIPTION OF THE DRAWINGS

For a more complete understanding of the present invention, and its advantages, reference will now be made in the following Detailed Description to the accompanying drawings, in which:

FIG. 5 is a flow diagram of the OS (Operating System) as an authority for initially setting up priority BW managed classes.

DETAILED DESCRIPTION

In the remainder of this description, a processing unit (PU) may be a sole processor of computations in a device. In such a situation, the PU is typically referred to as a CPU (Central Processing Unit). In multiprocessor systems, one or more PUs may be utilized as a central or main control unit for the purpose of distributing tasks to other PUs. However, in the remainder of this document, all processing units will be referred to as PUs.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code embodied on a computer readable medium, software, and/or integrated circuits that are coded to perform such functions, unless indicated otherwise.

Figure 1:
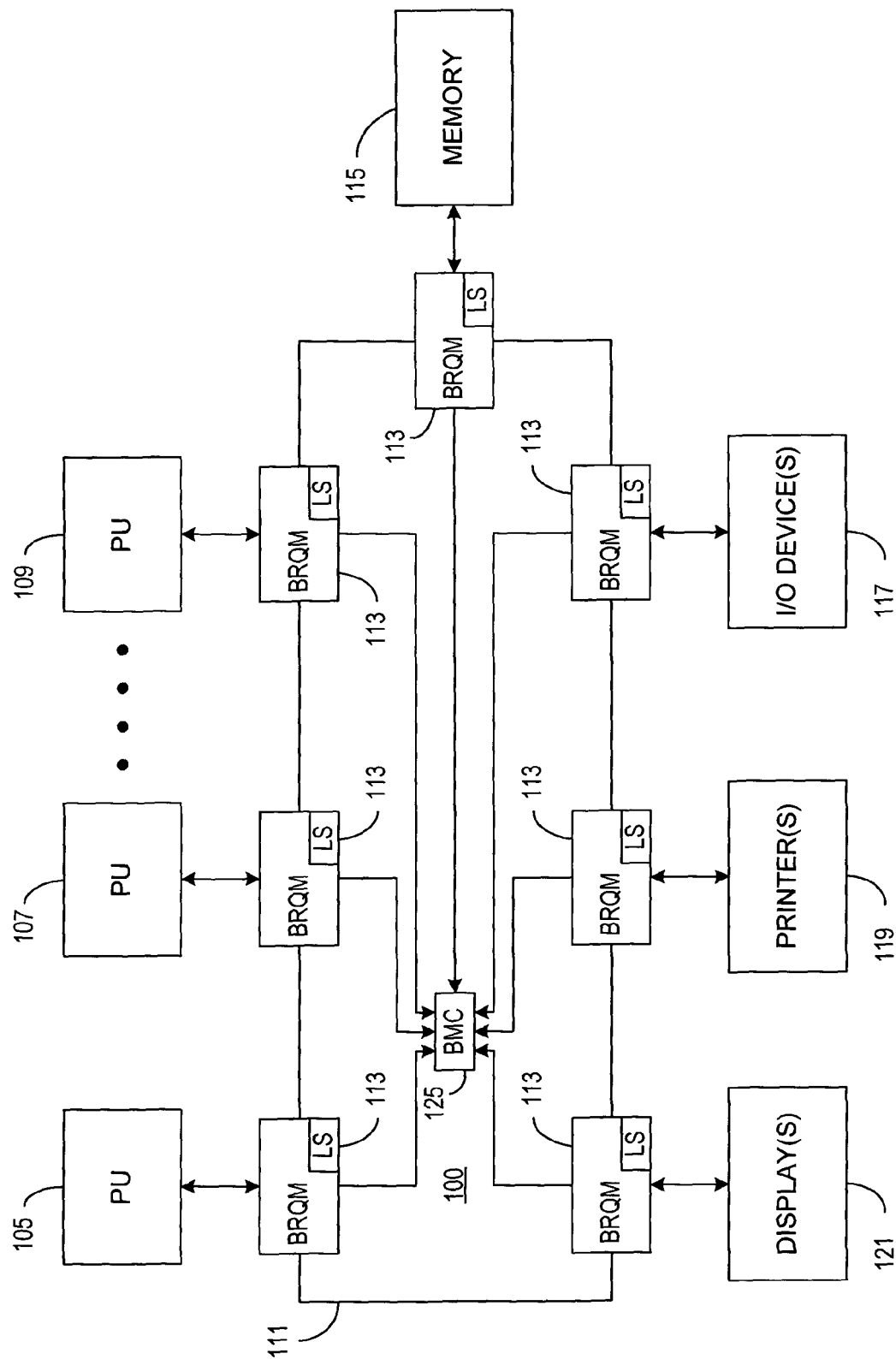
FIG. 1 is a block diagram of a plurality of PUs and other devices connected to a bus or other communication path.

In FIG. 1, a multiprocessor system is shown with a plurality of PUs. Three of the PUs are designated 105, 107 and 109. The dots between PUs 107 and 109 are an indication that many more PUs are typically located between PUs 107 and 109. Each of the PUs is interconnected to a bus 111 via a BRQM (Bus Request Queue Manager) 113. Each of the BRQMs may include an LS (Load Shaper) function. Likewise, a memory block 115 is connected to the bus 111 via a BRQM 113. In similar fashion, other devices such as one or more I/O (input/output) devices 117, one or more printers 119 and one or more displays 121 may also be connected to the bus 111 by BRQMs 113. It may be noted that present day printers and displays are generally not considered to be bus master type devices and thus would typically be merely considered as being among connected I/O devices. However, in view of the increasing intelligence of all computer connected devices, the display and printer devices are shown as presented for completeness of description. Finally, a BMC (Bandwidth Management Controller) 125 is connected to each BRQM 113. In a preferred embodiment, this connection comprises separate leads in each direction to minimize any potential communication latency. It may be noted that the BRQM function is commonly used in the prior art, but the LS function part of the BRQM and its interaction with the BMC is unique to the present invention.

Figure 4:
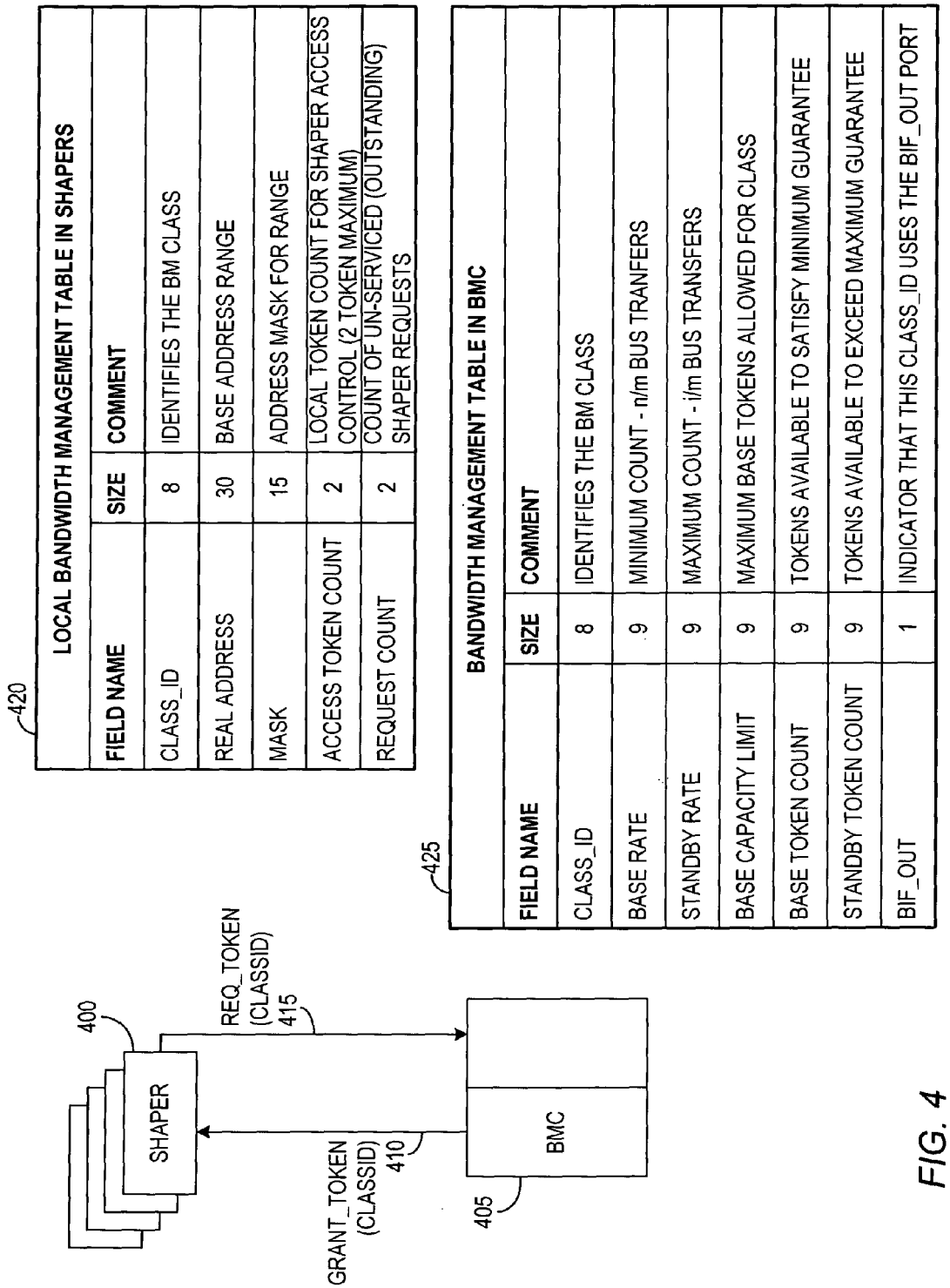
FIG. 4 provides more detail as to the interaction of the load shaper and the BMC and illustrates example databases or tables that may be used in connection with their operation.

In FIG. 4, a plurality of shapers 400 represent the function labeled LS in the blocks 113 of FIG. 1. A BMC 405 is representative of the BMC 125 in FIG. 1. Typically, each of the shapers or LSs 400 is connected by a pair of leads 410 and 415 to the BMC for requesting an additional token on lead 415 and receiving the grant of a token, where appropriate, on lead 410. Each of the shapers 400 contains a table similar to block 420 providing information relative any classes of managed data entities in a connected intelligent device, such as PU 105. A block 425 illustrates data that would be kept in the BMC 405 in some database or other table relative each BM class that is presently active.

Figure 2:
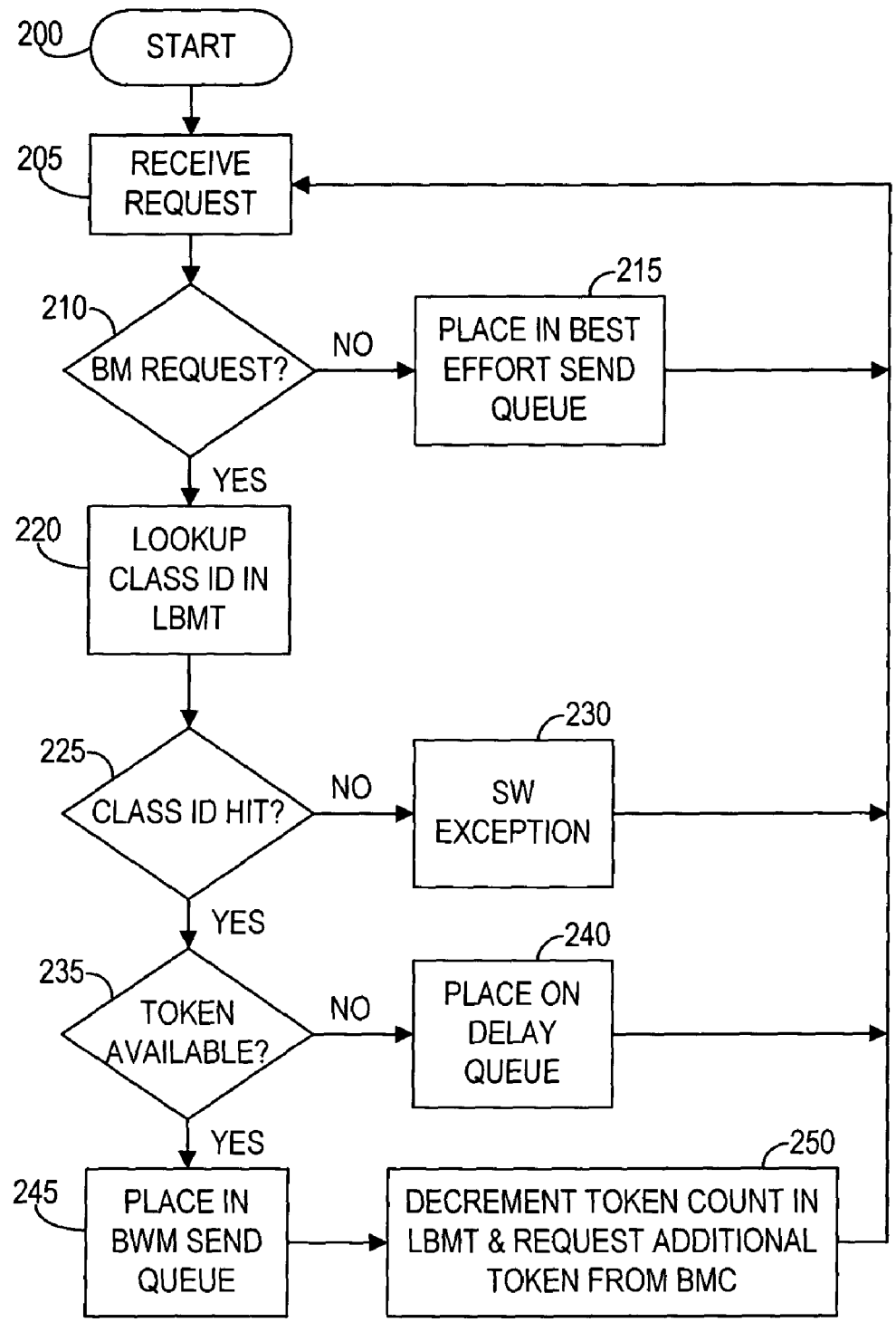
FIG. 2 is a flow diagram of operations in an LS (Load Shaper) portion of FIG. 1.
Figure 3:
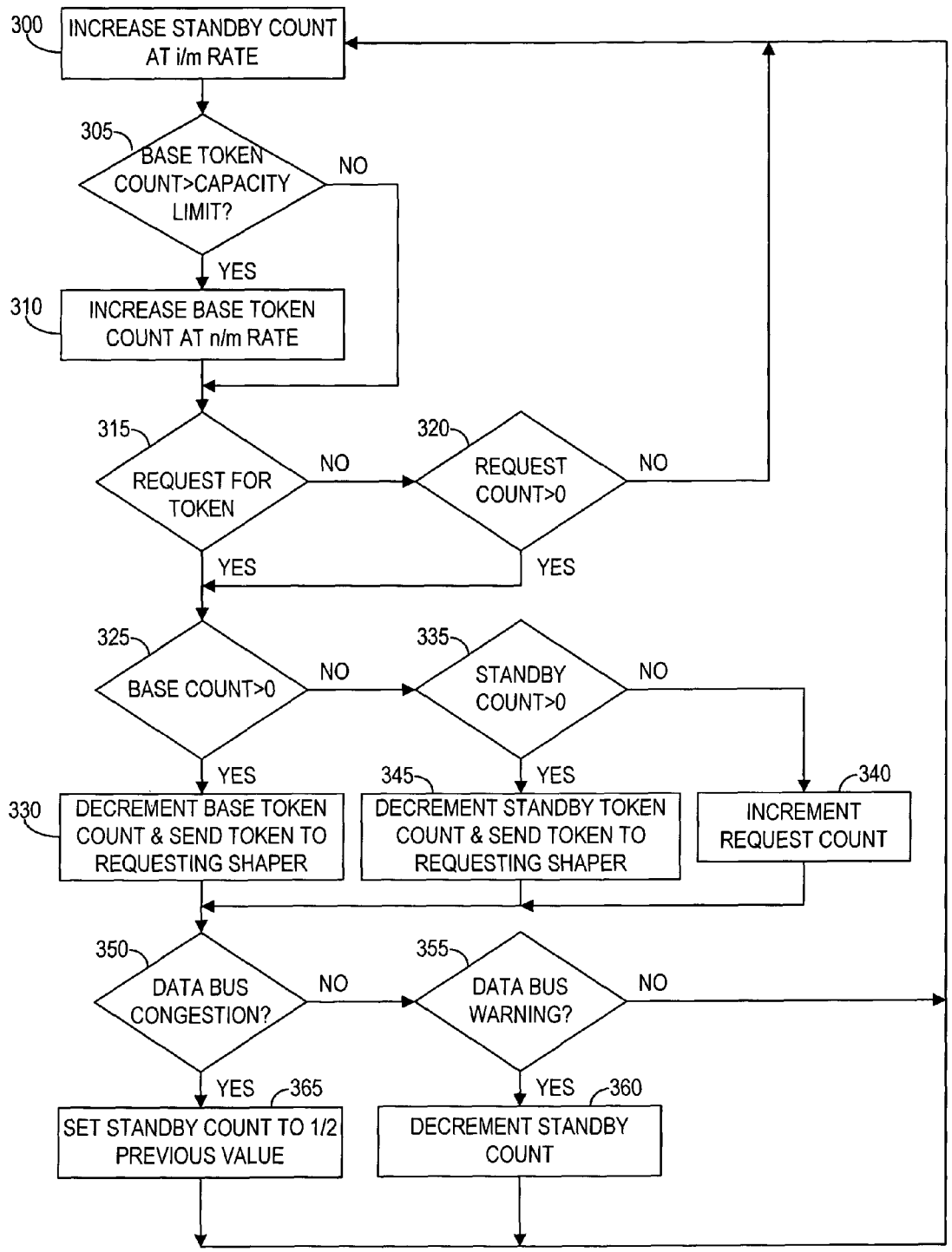
FIG. 3 is a flow diagram of operations in a BMC (Bandwidth Management Controller) portion of FIG. 1.

Referring now to FIGS. 1 and 4, a brief description of operation will be provided before providing a more detailed explanation of FIGS. 2 and 3. When any source entity wants to send a data packet over communication path 111 to a target entity, a request to use the path is sent to the BRQM 113 for permission to do so. If the request is from an unmanaged entity, and in the manner of the prior art, this data packet is placed in a "best efforts" queue and when the BRQM detects an available slot, the data packet is forwarded to the target.

When the source entity is an application that is to be managed, a first step of the application is to apply to some authority entity, such as the OS (Operating System) for the plurality of PUs, for permission to obtain a priority status and a given minimum BW (Bandwidth). If there is presently sufficient BW available, after the OS checks present traffic loads and already establishes or authorizes managed BW classes, the request is either granted or denied. If granted, both the LS and the BMC are informed of the grant and the requesting entity is provided with a class ID that is to be attached to any BWM (Bandwidth Managed) requests made in the future. From then on, when the LS ascertains that a received request is from a class presently authorized to be BWM and there is still unused BW for that class in the present operational time period, the data packet is placed in a special priority queue to be inserted in the path 111 prior to data packets in the best efforts queue. If the authorized minimum BW has been already used, in a given operational time period, and the path 111 is presently under-utilized, the BMC has the capability to grant extra BW in the form of standby tokens.

In a preferred embodiment of the invention, the LBMT (Local Bandwidth Management Table) in the LS has a (access) token count of two for each authorized class. Each token represents a given portion of the total authorized BW that a given data packet requires. As an example, a data packet may be 128 bytes, an operational time period may be a time equivalent to the time it takes to transmit 1024 data packets of 128 bytes each and an assigned BW may be equivalent to 9 data packets for a given class as shown in block 425. When a given class data packet is placed in queue, the LS decrements the count in the LBMT and immediately requests another token from the BMC to replace the used token or decremented token count. The BMC keeps track of all BW usage by a given class for each operational time period and when the authorized minimum BW is used up in a given time period, the BMC 125 or 405 can issue tokens from a standby counter. The LS does not recognize any difference between base or minimum authorized BW tokens and standby tokens. In this manner, a BWM class may be allowed to exceed the guaranteed BW whenever the path 111 or other resource is under-utilized.

It may also be noted at this time that, in a multiprocessor environment, an application can be processed in more than one PU simultaneously. Thus, when a thread of an application requests the use of the path 111 from a PU different from the one setting up a BWM class initially, the LS for that different PU can submit data packets to the path 111 in the same manner as the initial LS since the BMC provides a centralized tracking of the data packet usage by the BWM entity. The newly used LS may be informed in a reactive manner similar to that presently used in a cache miss. However, in the preferred embodiment of the invention, the LS is informed in a proactive manner. In other words, when a task or thread of an application starts on a different PU, the LS for that unit is informed and the LBMT of that LS is updated to contain the appropriate information.

The actions of the OS, in granting or denying the grant, are shown in FIG. 5. The action is substantially identical to that in a co-pending application assigned to the same assignee as the present invention and filed on the same day as the present invention. The teachings of this co-pending application are incorporated in this patent application. However, as a brief summary, the OS analyzes the topology of the resource being managed, such as path 111, before receiving requests as set forth in a block 510 before receiving and acting upon an application for BW management and desired BW as set forth in blocks 515 and 520. In the remaining blocks 525 through 560, the path from source to target is checked to make sure that there is adequate BW still available to grant or deny the present request. If granted, the BMC and associated LS have their tables updated to reflect the new class for BWM.

As shown in FIG. 2, the LS operation starts in a block 200 and in block 205 receives a request from an application or other entity in a connected device such as PU 105. This request is actually received initially by the BRQM 113 and forwarded to the LS portion thereof. A check is made in decision block 210 to ascertain if the request is from a BM (Bandwidth Managed) entity. If it is not, the requested data packet is placed in a best efforts send queue, as set forth in block 215, and the program then awaits receipt of the next request in block 205. If it is determined, from a class ID identifier accompanying the data packet request, that it is a BM request, the request ID is compared with data in the LS lookup table as set forth in block 220. An example of this data is shown as an LBMT 420 of FIG. 4. If, in decision block 225, the class ID cannot be found, the flow proceeds to a block 230 where the OS is contacted to ascertain if this is a SW (software) exception and the OS takes over from there. The LS returns to block 205 to await the next request. This SW exception would be included in the reactive approach to managed data packets being received by an LS whose table does not presently include any reference to a given managed class request.

If there is a "hit" in block 225, a check is made in the access token count portion of the LBMT 420 for that class ID to see if any tokens are available as set forth in block 235. As mentioned above, after the guaranteed BW tokens or base tokens are used up, the class BW may be supplemented by standby tokens when the path 111 is presently being under-utilized. If there are no remaining tokens for the present operational period, the process moves to block 240 where the request is placed in a delay queue and is passed to the bus near the beginning of the next operational time period. If, on the other hand, there is a token shown to be available in the LBMT, the data packet is placed in the class appropriate BWM send queue as set forth in a block 245. The token count in the LBMT 420 is decremented and a request is made to the BMC 125 for another token for that class, as shown in a block 250, before returning to block 205 to await another request.

As previously mentioned, the flow diagram of FIG. 3 represents in broad form the steps taken by the BMC 125 in controlling the BW allocated to each class of managed entities attempting to use the communication path 111. A first block 300 operates to increase the standby count for each class listed in the BMT, such as 425, at a linear and uniformly increasing rate. This rate is expressed in block 300 as i/m where "i" is the number of 128 byte data packets or transfer units, each represented by a token count, that the standby count is increased per unit operational time period "m". As explained in the example supra, "m" might be 1024 transfer units or data packets long. Thus, the value of "i" might be 2 or 3 in a typical application and is a predetermined value used by the BMC. As shown in the block 425 for a given class, the maximum value of the standby count for this class is 9 tokens and, as shown, none of the nine tokens have been used during the present operational time period.

The next step is presented in a decision block 305 where a check is made in the BMT 425 to ascertain if the base token count is less than the base capacity limit. If it is, the next step is to increase the base token count at the n/m rate as set forth in block 310. "N" represents the number of tokens the base count should be increase during the operational time period "m". Although the count could be refreshed at the beginning of each "m" period, the preferred embodiment increases the base token count at a fixed rate to spread the availability of tokens over the entire "m" time periods. After the count is increased, a decision block 315 is entered where a check is made to see if there has been a request for a token from the class being checked. It will be noted that, if in block 305 it is determined that no token requests have been made recently, the base token count will be already at the capacity limit, and thus the process will go directly from block 305 to 315. If there has not been a request for a token, the next step is a decision block 320 to ascertain if the request count for the operational time period "m" is greater than zero. If not, it returns to block 300. If the decision is YES in either of blocks 315 or 320, the next step occurs in a decision block 325 to determine if the base token count is greater than zero. If it is, this count is decremented in the BMT as set forth in block 330 and a token is sent to the requesting LS or shaper 400. The next step, after a NO decision by block 325, is in a decision block 335 where a check is made of the standby count.

If the standby count is not greater than zero, the process increments the request count in a block 340 and then continues to a data bus congestion decision block 350. If the standby count is greater than zero in block 335, the count is decremented in block 345 and a token is sent to the requesting shaper before proceeding to block 350. The decision block 350 may also be entered directly from previously mentioned block 330 after the token is sent to the requesting shaper. If the bus usage is below a critical level such that the usage is not considered to be congested, the process goes to a decision block 355 where a determination is made as to whether the usage level exceeds a lesser value that would constitute a warning of congestion about to occur. If the level is less than the warning level, the program returns to block 300. If, however, in block 355, it is determined that the warning level of use has been exceeded, the standby count for the class is decremented by a given amount, such as one, in a block 360 before returning to block 300. If, in block 350, the level of usage on the bus is considered to have reached a level so high that congestion is or is about to occur, the standby count in the BMT is reduced to ½ of the previous count in a block 365 before returning to block 300.

In a preferred embodiment, the LBMT 420 also includes a count of un-serviced or outstanding shaper requests. The reason for keeping such a count is that it is possible the shaper will request all the allowed tokens and the BMC will not have tokens to allocate. Thus, if an accurate indication of the outstanding requests is not kept, the shaper can be starved or otherwise left with a less than adequate number of tokens for proper operation.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. An apparatus for bandwidth management over a multiplexed communication path, comprising:
   a plurality of load shapers configured to:
   maintain a local bandwidth management table comprising a local token count for each of a plurality of classes of source entities, wherein said classes of source entities are classes of application programs seeking access to the multiplexed communication path;
   receive a data packet from a source entity;
   determine that the source entity belongs to a class that is one of the plurality of classes;
   check the local token count for availability of tokens for said class of the source entity;
   transmit the data packet over the multiplexed communication path if the local token count for the class of the source entity is at least one;
   decrement the local token count for the class of the source entity in the local bandwidth management table in response to the transmission; and
   a Bandwidth Management Controller configured to:
   maintain a centralized bandwidth management table comprising a base token count for each of the plurality of classes of source entities, wherein a minimum bandwidth is reserved for each of the plurality of classes of source entities and the base token count increases at a rate corresponding to the minimum bandwidth; and wherein:
   the plurality of load shapers is further configured to request a token for the class of the source entity from the Bandwidth Management Controller in response to the transmission; and
   the Bandwidth Management Controller is further configured to respond to the request if the base token count for the class of the source entity is at least one by:
   providing a token and decrementing the base token count for the class of the source entity.

2. The apparatus of claim 1, wherein:
   the centralized bandwidth management table further comprises a standby token count for each of the plurality of classes of source entities; and
   the Bandwidth Management Controller is further configured to respond to the request if the base token count for the class of the source entity is zero and the standby token count for the class of the source entity is at least one by:
   providing a token and decrementing the standby token count for the class of the source entity.

3. The apparatus of claim 2, wherein the Bandwidth Management Controller is further configured to:
   linearly increase the standby token count for each of the plurality of classes of source entities when the communication path is not congested, and exponentially decrease the standby token count for each of the plurality of source entities when the communication path is congested.

4. The apparatus of claim 1, wherein the local token count for each of the plurality of classes of source entities has a maximum count of two tokens.

5. The apparatus of claim 1, wherein the plurality of load shapers is further configured to maintain a count of outstanding requests for tokens.

6. The apparatus of claim 1, wherein the apparatus is a multi-processor system comprising:
   a plurality of processor units, wherein each of said plurality of processor units is associated with a respective one of said plurality of load shapers;
   a bus interconnecting each of said plurality of processor units;
   a display device connected to said plurality of processor units and configured to display data from each of said plurality of processor units.

7. A method of bandwidth management over a multiplexed communication path, comprising:
   maintaining a centralized bandwidth management table comprising a base token count for each of a plurality of classes of source entities, said classes of source entities being classes of application programs seeking access to the multiplexed communication path, wherein a minimum bandwidth is reserved for each of the plurality of classes of source entities and the base token count increases at a rate corresponding to the minimum bandwidth;
   maintaining a local bandwidth management table comprising a local token count for each of the plurality of classes of source entities;
   receiving a data packet from a source entity;
   determining that the source entity belongs to a class that is one of the plurality of classes;
   checking the local token count for availability of tokens for said class of the source entity;
   transmitting the data packet over the multiplexed communication path if the local token count for the class of the source entity is at least one;
   decrementing the local token count for the class of the source entity in the local bandwidth management table in response to the transmission;
   requesting a token for the local token count for the class of the source entity in response to the transmission; and
   if the base token count for the class of the source entity is at least one, providing the requested token and decrementing the base token count for the class of the source entity.

8. The method of claim 7, wherein:
   the centralized bandwidth management table further comprises a standby token count for each of the plurality of classes of source entities;
   and further comprising:
   if the base token count for the class of the source entity is zero and the standby token count for the class of the source entity is at least one, providing the requested token and decrementing the standby token count for the class of the source entity.

9. The method of claim 8, further comprising:
   linearly increasing the standby token count for each of the plurality of classes of source entities when the communication path is not congested; and
   exponentially decreasing the standby token count for each of the plurality of source entities when the communication path is congested.

10. The method of claim 7, wherein the local token count for each of the plurality of classes of source entities has a maximum count of two tokens.

11. The method of claim 7, further comprising maintaining a count of outstanding requests for tokens.

12. The method of claim 7, wherein said method of bandwidth management is performed in a multi-processor system comprising a plurality of processor units; and
   wherein said local bandwidth management table is one of a plurality of local bandwidth management tables each being associated with a respective one of said plurality of processor units.

13. The method of claim 12, further comprising:
   linearly increasing the standby token count for each of the plurality of classes of source entities when the communication path is not congested, and
   exponentially decreasing the standby token count for each of the plurality of source entities when the communication path is congested.

14. The method of claim 7, wherein the centralized bandwidth management table further comprises a standby token count for each of the plurality of classes of source entities, the method further comprising:
   responding to the request if the base token count for the class of the source entity is zero and the standby token count for the class of the source entity is at least one by:
   providing a token and decrementing the standby token count for the class of the source entity.

15. A computer program for bandwidth management over a multiplexed communication path, the computer program embodied on a tangible computer readable storage device comprising:
   computer code for maintaining a centralized bandwidth management table comprising a base token count for each of a plurality of classes of source entities, said classes of source entities being classes of application programs seeking access to the multiplexed communication path, wherein a minimum bandwidth is reserved for each of the plurality of classes of source entities and the base token count increases at a rate corresponding to the minimum bandwidth;
   computer code for maintaining a local bandwidth management table comprising a local token count for each of the plurality of classes of source entities;
   computer code for receiving a data packet from a source entity; computer code for determining that the source entity belongs to a class that is one of the plurality of classes;
   computer code for checking the local token count for availability of tokens for said class of the source entity;
   computer code for transmitting the data packet over the multiplexed communication path if the local token count for the class of the source entity is at least one;
   computer code for decrementing the local token count for the class of the source entity in the local bandwidth management table in response to the transmission;
   computer code for requesting a token for the local token count for the class of the source entity in response to the transmission; and
   computer code for, if the base token count for the class of the source entity is at least one, providing the requested token and decrementing the base token count for the class of the source entity.

16. The computer program of claim 15, wherein:
   the centralized bandwidth management table further comprises a standby token count for each of the plurality of classes of source entities;

and further comprising:

computer code for, if the base token count for the class of the source entity is zero and the standby token count for the class of the source entity is at least one, providing the requested token and decrementing the standby token count for the class of the source entity.

17. The computer program of claim 16, further comprising:

computer code for linearly increasing the standby token count for each of the plurality of classes of source entities when the communication path is not congested; and computer code for exponentially decreasing the standby token count for each of the plurality of source entities when the communication path is congested.

18. The computer program of claim 15, wherein the local token count for each of the plurality of classes of source entities has a maximum count of two tokens.

19. The computer program of claim 15, further comprising maintaining a count of outstanding requests for tokens.

* * * * *